United States Patent [19]

Sweeney

[11] Patent Number: 4,539,013

[45] Date of Patent: Sep. 3, 1985

[54] PROCESS FOR TREATING GASOLINE OR GASOHOL BY CONTACT WITH KF OR $K_2CO_3$

[75] Inventor: William M. Sweeney, Wappingers Falls, N.Y.

[73] Assignee: Texaco Inc., White Plains, N.Y.

[21] Appl. No.: 309,535

[22] Filed: Oct. 7, 1981

[51] Int. Cl.$^3$ ................................................ C10L 1/30
[52] U.S. Cl. .......................................... 44/56; 44/67; 44/68; 44/79
[58] Field of Search ......................... 44/56, 67, 68, 79; 208/188

[56] References Cited

U.S. PATENT DOCUMENTS 1,452,206  4/1923  Mann, Jr. ............................ 568/916

Primary Examiner—Mrs. Y. Harris-Smith
Attorney, Agent, or Firm—Robert A. Kulason; Carl G. Ries

[57] ABSTRACT

A water-containing fuel boiling in the gasoline boiling range, such as gasoline or gasohol, is contacted with a substantially saturated aqueous solution of potassium fluoride (or carbonate) plus solid potassium fluoride (or carbonate) and dry fuel is recovered.

21 Claims, 1 Drawing Figure

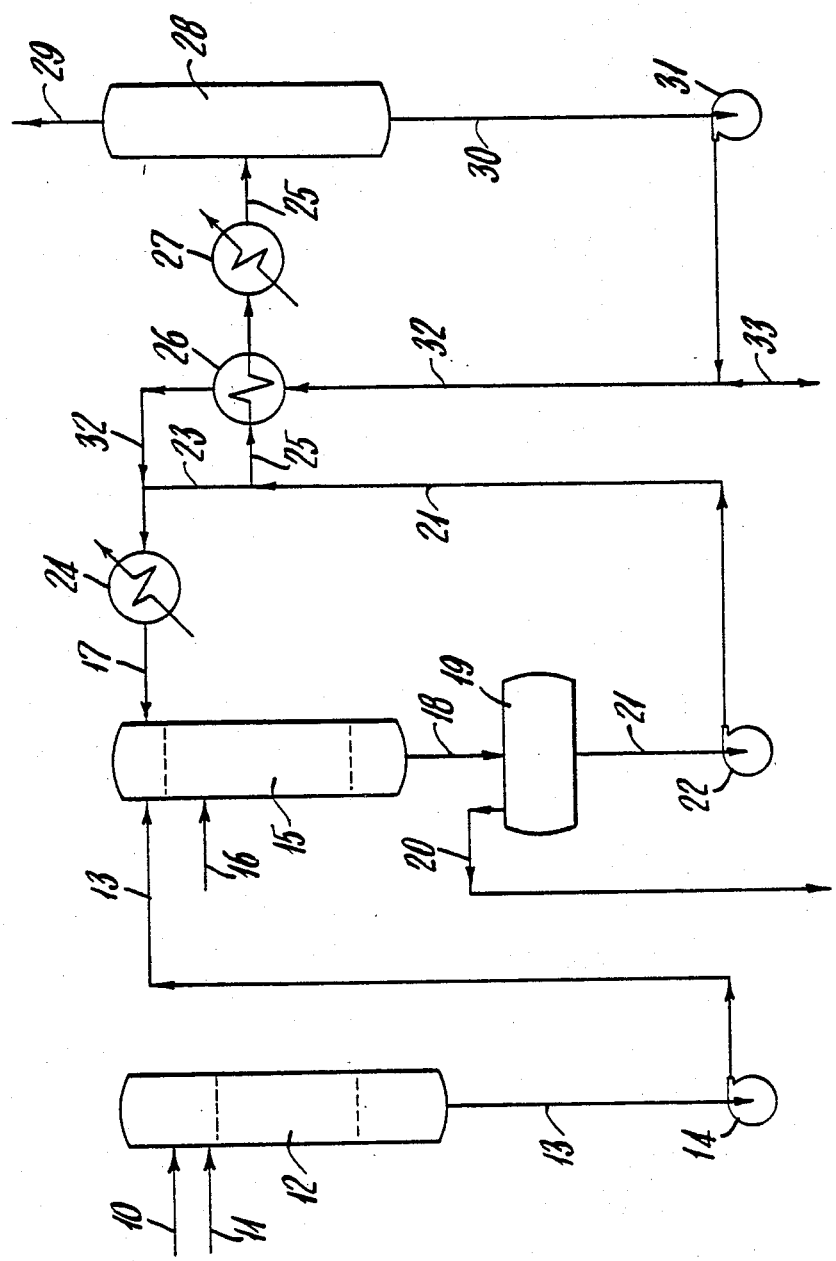

PROCESS FOR TREATING GASOLINE OR GASOHOL BY CONTACT WITH KF OR K₂CO₃

FIELD OF THE INVENTION

This invention relates to a novel method of removing water from water-containing fuels boiling in the gasoline boiling range (including gasoline, naphtha, xylene, etc.) and from gasohol containing a water-miscible alcohol, and to the compositions so obtained. More particularly it relates the prevention of phase separation by drying of a gasoline-ethanol or gasoline-methanol mixture containing water.

BACKGROUND OF THE INVENTION

As is well known to those skilled in the art, liquid hydrocarbons may be combined with alcohols, typically water-miscible alcohols. Typical of such products is gasohol, which is a mixture of motor fuel, such as gasoline or naphtha with an alcohol, such as ethanol. It is found that such mixtures are normally single-phase mixtures when formulated from eg gasoline and anhydrous ethanol; but those formulated from gasoline and 95 w % ethanol are two phase mixtures characterized at best by a haze and at worst by separation into a water phase and a hydrocarbon phase. Even gasohol prepared from dry gasoline and anhydrous ethanol picks up water from various sources during handling; and the presence of this water in amounts as small as 0.1 v %–4 v % (depending on the temperature and the composition of the product) may cause the composition to separate into two phases: (i) a hydrocarbon phase and (ii) an alcohol-water phases.

It is an object of this invention to provide a method of treating such mixtures to prevent formation of more than one phase. Other objects will be apparent to those skilled in the art.

STATEMENT OF THE INVENTION

In accordance with certain of its aspects, this invention is directed to a method of treating a water-containing hydrocarbon charge fuel containing at least one fuel selected from the group consisting of water-containing hydrocarbon fuel boiling in the gasoline boiling range and water-containing gasohol which comprises contacting said charge water-containing fuel with a salt selected from the group consisting of potassium fluoride and potassium carbonate thereby forming a multi-phase system including (i) a first phase of supernatant fuel containing less water than is present in said charge fuel and (ii) a second phase containing aqueous solution of said salt; and recovering said first phase containing less water than is present in said charge fuel.

DESCRIPTION OF THE INVENTION

The compositions which may be treated by the method of this invention include liquid hydrocarbon fuels. Although it is possible to treat liquid hydrocarbon fuels of lower molecular weight, the advantages of this invention are particularly apparent when the hydrocarbon fuel is a liquid at ambient conditions, typically 25° C. and atmospheric pressure.

The liquid hydrocarbon fuel may typically be a fuel boiling in the gasoline boiling range including motor fuel such as a gasoline (including naphtha, xylene, etc.) When the fuel is a gasoline, it may for example be a 100 octane blended gasoline having an ep of 320° F. When the fuel is a naphtha it may be characterized by its ibp of 200° F. and its ep of 320° F. The fuel may also be a gasohol prepared by mixing a liquid hydrocarbon fuel with absolute alcohol. Such fuels may form two-phases on contact with water.

It is a particular feature of the process of this invention that it finds use in treating gasohol which is made by mixing gasoline and wet alcohol—preferably gasoline and 95 w % ethanol. Typically such a gasohol may be formulated by mixing 90 volumes (62.3 parts) of dry gasoline with 10 volumes (8.1 parts) of 95 w % ethanol. Mixing may be effected in a mixing tank or by passing the mixture through a bed of inert packing. The gasohol so prepared is found to be a two-phase mixture; and depending on the temperature and the relative amount of the components may be a hazy gasoline or two phases may be visible.

In practice of this invention, the so-prepared mixture is contacted with a salt selected from the group consisting of potassium fluoride KF and potassium carbonate $K_2CO_3$. It is possible to use these materials in anhydrous form KF and $K_2CO_3$; but as will be apparent to those skilled in the art, this is neither necessary nor economically desirable. It is possible to use them in any of their hydrate forms viz $KF.2H_2O$ or $K_2CO_3.2H_2O$ or $2K_2CO_3.3H_2O$. It is more preferred to use aqueous solutions of the salts and in this instance, the more closely the solution approximates a saturated aqueous solution, the more desirable. Saturated solution is particularly preferred.

In the most preferred embodiment, the so-prepared mixture is contacted with a saturated aqueous solution of potassium fluoride in the presence of solid potassium fluoride. Although the saturated aqueous solution may contain as little as eg 95 w % of the amount of potassium fluoride necessary to form a saturated solution, it is preferred that the solution be substantially 100% saturated at the temperature of operation, which may be 40° F.–120° F., preferably 60° F.–90° F., say 70° F. At the preferred temperature of operation of 70° F., a saturated aqueous solution contains about 49 w % potassium fluoride i.e. 98 parts of potassium fluoride per 100 parts of water.

It may be possible to effect the process of this invention by mixing the charge gasoline or gasohol with the saturated aqueous solution of potassium fluoride and solid potassium fluoride (as a slurry) in a mixing tank. The gasoline or gasohol (100 parts) may be contacted wth 0.1–100 parts preferably 1–10 parts, say 10 parts of solid potassium fluoride and 0.1–20 parts, preferably 1–10 parts, say 2 parts of aqueous potassium fluoride solution. It is found however that more facile operation may be achieved if the mixture of liquids (gasoline or gasohol and saturated aqueous potassium fluoride solution) is passed through a bed of solid potassium fluoride. Make-up solid potassium fluoride may be added to the bed from time to time to replenish that which is dissolved out.

The mixture of gasoline or gasohol and aqueous potassium fluoride solution is withdrawn from the contacting operation and passed to a settling operation. The upper layer of gasoline or gasohol is separated and withdrawn. The gasoline or gasohol so obtained is commonly found to contain less than 0.4 w % water and to be a single-phase system free of haze at 70° F. room temperature.

The lower phase, an aqueous solution of potassium fluoride, commonly containing potassium fluoride in amount of 95 w %–99 w %, preferably 95 w %–98 w %, say 97 w % of the saturation level at the temperature of operation, is withdrawn. So long as the concentration of potassium fluoride in this liquid is above about 95 w % of the saturation value (i.e. above about 45 w % at the preferred operating temperature of 70° F.), this liquid may be recycled to the contacting operation, with adjustment of temperature if necessary.

When the concentration of potassium fluoride drops below this level, a portion of the recycling liquid may be passed to a flashing operation wherein it may be concentrated. In a preferred embodiment, a portion of the recycling stream is continuously passed to the flashing operation. It may be heated by exchange against the flashed bottoms and then further heated to 300° F.–500° F., say 400° F. and passed into a flash drum wherein water is flashed off and removed as overhead. The flashed bottoms, preferably a saturated solution, is withdrawn, cooled against the charge to flashing and recycled to the contacting operation. Preferably the temperature of the aqueous solution admitted to the contacting operation is 40° F.–120° F., say 70° F.; and heat exchange is provided to lower the temperature to this point.

Practice of the process of this invention will be apparent to those skilled in the art from the examples which follow in which as elsewhere in this description, all parts are parts by weight unless otherwise stated.

DESCRIPTION OF PREFERRED EMBODIMENTS

EXAMPLES I–V

In this series of comparative examples, a mixture of 81 ml of a standard lead-free gasoline is mixed with 9 ml of absolute ethanol and 4.5 ml of distilled water. A two-phase mixture is formed containing 83.5 ml of upper layer containing principally hydrocarbon and alcohol and 11 ml of lower aqueous layer containing principally water and alcohol. In each of the Examples I–V, there are added incremental amounts (of 1.8 grams) of experimental and control *solid salts and the volumes of the hydrocarbon phase and the water phase are measured.

| Example | Salt Added | Amount g | Hydrocarbon phase ml | Aqueous phase ml |
|---|---|---|---|---|
| Charge | — | — | 83.5 | 11 |
| I a | $K_2CO_3$ | 1.8 | 85.5 | 9.5 |
| b | $K_2CO_3$ | 1.8 | 89.0 | 6.0 |
| c | $K_2CO_3$ | 1.8 | 90.0 | 6.0 |
| II* a | LiCl | 1.8 | 82.5 | 11.5 |
| b | LiCl | 1.8 | 81.0 | 13.5 |
| III* a | $KC_2H_3O_2$ | 1.8 | 84.5 | 10.5 |
| b | $KC_2H_3O_2$ | 1.8 | 85.5 | 10.5 |
| c | $KC_2H_3O_2$ | 1.8 | 84.5 | 12.0 |
| d | $KC_2H_3O_2$ | 1.8 | 83.5 | 14 |
| e | $KC_2H_3O_2$ | 1.8 | 82.0 | 16 |
| IV* a | $NAHSO_4$ | 1.8 | 82.5 | 12.5 |
| V* a | $Mg(NO_3)_2.6H_2O$ | 1.8 | 82.5 | 12 |
| b | $Mg(NO_3)_2.6H_2O$ | 1.8 | 83.1 | 13 |
| c | $Mg(NO_3)_2.6H_2O$ | 1.8 | 82.0 | 14 |
| d | $Mg(NO_3)_2.6H_2O$ | 1.8 | 81.5 | 15 |
| e | $Mg(NO_3)_2.6H_2O$ | 1.8 | 81.5 | 17 |
| f | $Mg(NO_3)_2.6H_2O$ | 1.8 | 82.5 | 18.4 |

The alcohol content of the hydrocarbon phase in experimental Example I c was 7.7% (theory 10%). In contrast, the corresponding alcohol content of the others were Example II b—1.8%; III d—4.1%; IV—2.8%; V e—1.8%.

From the above it will be apparent to those skilled in the art that the charge two-phase mixture contained 83.5 ml of hydrocarbon. As the first aliquot of 1.8 g of $K_2CO_3$ is added, this hydrocarbon layer increased to 85.5 ml. As the second and third aliquots were added (to give a total of 5.4 g) the hydrocarbon layer increased to 90 ml. The aqueous phase at this point has decreased to almost one-half its former value (6 v 11).

In contrast addition of the solid salts in control Examples II–V generally produced either little or no effect (eg Example III a) or the opposite effect (eg Example V a).

The amount of alcohol extracted into the aqueous phase was significantly increased as the concentration of potassium acetate was increased; and the amount of hydrocarbon phase actually decreased in Example III c, d, e*. Note in particular Example III d wherein the alcohol content of the aqueous phase was undesirably 4.1%, thus showing that the potassium acetate was withdrawing alcohol from the hydrocarbon in large quantities.

EXAMPLE VI

In this series of comparative examples, the charge mixture was made up from 50 ml of a standard lead-free gasoline, 5 ml of absolute ethanol, and 20 ml of distilled water. The upper hydrocarbon phase contained 50.5 ml and the lower aqueous layer contained 23.5 ml. Solid potassium fluoride KF was added in increments.

| Example | Salt Added | Amount g | Hydrocarbon phase ml | Aqueous phase ml |
|---|---|---|---|---|
| Charge | — | | 50.5 | 23.5 |
| VI a | KF | 10 | 53.5 | 23.6 |
| b | KF | 3 | 54.0 | 23 |
| c | KF | 6 | 53.5 | 25 |

The alcohol content of the hydrocarbon layer after the 19 g of KF had been added, was 9.0% (theory 9.1%). Thus substantially all of the alcohol remained in the hydrocarbon phase.

EXAMPLE VII

In this example, the charge was made up from 50 ml of xylene, 5 ml of absolute ethanol, and 5 ml of distilled water. The upper hydrocarbon layer contained 51 ml and the lower aqueous layer contained 9 ml. The salt added was potassium fluoride brine (10 ml) recovered from Example VI c.

| Example | Salt Added | Hydrocarbon phase ml | Aqueous phase ml |
|---|---|---|---|
| Charge | — | 51 | 9 |
| VII | 10 ml KF brine | 54.5 | 15.5 |

The aqueous phase contained 8.6% alcohol (theory 9.1%).

EXAMPLE VIII

In this example, the charge was made up from 90 ml of standard lead-free gasoline, 10 ml of absolute ethanol, and 10 ml of distilled water. The salt was added as solid salt.

| Example | Salt Added | Amount g | Hydrocarbon phase ml | Aqueous phase ml |
|---|---|---|---|---|
| Charge | — | — | 93 | 17 |
| VIII a | KF | 2 | 96.5 | 14.5 |
| b | KF | 2 | 99 | 11 |
| c | KF | 2 | 98 | 11.5 |
| d | KF | 2 | 98 | 12 |

It will be apparent that after 4 grams total of potassium fluoride (Example VIII b) had been added, the amount of the aqueous phase had dropped to 10% (from the 15.5% originally present—50% larger).

EXAMPLE IX

In this example, the charge was made up from 180 ml of standard lead-free gasoline, 20 ml of absolute ethanol, and 40 ml of distilled water. The salt was added as solid salt.

| Example | Salt Added | Amount g | Hydrocarbon phase ml | Aqueous phase ml |
|---|---|---|---|---|
| Charge | — | — | 185 | 55 |
| IX a | KF | 16 | 192 | 53 |
| b | KF | 8 | 197 | 50 |
| c | KF | 8 | 196 | 54 |
| d | KF | 8 | 198 | 56 |

After the total of 40 grams of KF had been added, a trace of the solid salt remained in the brine. At this point the hydrocarbon layer contained 10.5% alcohol (theory 10%) and 0.29% water.

It will be apparent that after 24 grams of potassium fluoride (Example IX b) had been added, the amount of the aqueous phase had dropped by about 10% (from 22% down to 20%).

EXAMPLES X–XVI

In this series of Examples, the charge is 95 ml gasohol (90 v % gasoline and 10 v % absolute ethanol) plus 0.5 ml distilled water. Upon being mixed, the mixture is hazy but after three hours, it becomes clear liquid containing 94.5 ml of hydrocarbon phase and 0.5 ml aqueous phase. To each of several aliquots of this mixture there was added, with mixing, 2 ml of a saturated solution of the noted salt which contained an excess of solid. The phases were noted after a minute or so. (Error of observation may account for as much as 2.5 ml in a typical instance).

| Example | Salt Added | Hydrocarbon phase ml | Aqueous phase ml |
|---|---|---|---|
| Charge | — | 94.5 | 0.5 |
| X | KF | 95 | 5 |
| XI | $K_2CO_3$ | 95 | 5 |
| XII* | $Mg(NO_3)_2.6H_2O$ | 85 | 10 |
| XIII* | $H_3PO_4$ | 85 | 15 |
| XIV* | $KC_2H_3O_2$ | 95 | 5 |
| XV* | $NaHSO_4$ | 90 | 10 |
| XVI* | LiCl | 85 | 15 |

It was noted that in Examples X and XI, the hydrocarbon phase was clear in a few minutes. In Examples XIII–XVI, the hydrocarbon phase was still hazy—equivalent to the charge. Examples XII–XVI required 2–3 hours to separate into two phases.

EXAMPLES XVII–XVIII

In this series of Examples, the procedure of Examples X–XVI was duplicated except that the charge contained 100 ml of gasohol (90 v % gasoline and 10 v % absolute ethanol) and 1.0 ml distilled water. This mix was initially hazy; but after two hours it separated into 95 ml of hydrocarbon layer and 5 ml of aqueous layer.

In Example XVII, there was added 2.5 ml of saturated aqueous potassium fluoride solution containing an excess of solid potassium fluoride. In Example XVIII, there was added 5.0 ml of saturated aqueous calcium chloride solution containing excess of solid calcium chloride.

| Example | Salt Added | Hydrocarbon phase ml | Aqueous phase ml |
|---|---|---|---|
| Charge | — | 95 | 5 |
| XVII | KF | 97 | 3 |
| XVIII* | $CaCl_2$ | 94 | 8 |

From these Examples, it was noted that the KF system of Example XVII yielded a clear hydrocarbon layer almost immediately. Use of KF also permitted attainment of increased quantity of hydrocarbon and decreased quantity of aqueous phase.

EXAMPLES XIX–XXII

In this series of comparative examples, charge mixtures were made up from 90 ml of standard lead-free gasoline, 10 ml of absolute ethanol, and 0.5 ml of distilled water. The mixture so formed was hazy and settled to form 99.5 ml of upper hydrocarbon layer and 0.5 ml of lower aqueous layer. There was added to each aliquot 5 ml of an aqueous slurry of salt to be tested, and the mixture was observed after four hours and again overnight (ca 18 hours) at which times the amount and appearance of the phases was noted.

| | | four hours | | overnight | |
|---|---|---|---|---|---|
| Example | Aqueous Slurry | Hydrocarbon phase ml | Aqueous phase ml | Hydrocarbon phase ml | Aqueous phase ml |
| Charge | — | 99.5-hazy | 0.5 | 99.5-clear | 0.5 |
| XIX* | NaF | 88 hazy | 11 | 88 clear | 10 |
| XX* | $Na_2CO_3$ | 90 hazy | 10 | 95 clear | 5 |
| XXI | KF | 95 clear | 6 | 94 clear | 6 |
| XXII | $K_2CO_3$ | 94 clear | 6 | 94 clear | 6 |

The concentration (wt %) of water and ethanol in the hydrocarbon layer after standing overnight is as follows:

| Example | water % | Ethanol % |
|---|---|---|
| XIX* | 0.16 | 2.1 |
| XX* | 0.33 | 4.6 |
| XXI | 0.17 | 7.3 |
| XXII | 0.25 | 6.6 |

It will be apparent that in control Examples XIX* and XX* the ethanol content of the hydrocarbon layer is undesirably decreased by a substantial amount whereas in Experimental Examples XXI–XXII, the ethanol content is much higher.

From the above it is apparent that use of aqueous slurries of potassium fluoride or potassium carbonate, the preferred embodiments of this invention, permits attainment of product containing increased amount of hydrocarbon phase and decreased amounts of aqueous phase. For example comparison of control Example XIX* with experimental Example XXI shows that with use of an NaF slurry it is possible after 4 hours to obtain only 88 ml of hazy hydrocarbon whereas use of the preferred KF slurry gives 95 ml of clear hydrocarbon. Furthermore the hydrocarbon layer in the control desirably contains 3.5 times (7.3/2.1) as much ethanol. Other advantages may be noted from inspection of the above table.

It wll also be apparent to those skilled in the art that the above equilibrium test reveal that the compositions of this invention, whether used as aqueous brine, saturated aqueous brine, solid, or slurry, will permit attainment of a system wherein the hydrocarbon phase is characterized by increased volume, by increased alcohol content, and by decreased water content. The aqueous phase is characterized generally by decreased content of hydrocarbon and of alcohol. It will be noted that in some instances the volume of the aqueous phase may actually increase because the addition of certain salts to water produces a solution of greater volume than that of the water from which the solution was formed.

EXAMPLE XXIII

In the drawing, which is a schematic flowsheet of the best mode contemplated for carrying out the process of this invention, 129 parts of gasoline are admitted through line 10 together with 12.7 parts of 95 w % ethanol through line 11 to mixing operation 12. Although it may be possible to utilize a mixing tank (with or without agitation) preferably operation 12 may include a packed bed. There is removed through line 13 a two phase gasohol composition which is pumped at ambient temperature (ca 70° F.) through pump 14 to contacting operation 15.

In contacting operation 15, there is a bed of solid potassium fluoride (schematically shown as being replenished through line 16). There is also admitted to contacting operation 15 through line 17 aqueous saturated potassium fluoride solution (10 parts) at 70° F. containing 50 w % potassium fluoride.

As the charge two-phase gasohol from line 13 passes downwardly (together with the saturated potassium fluoride solution) through the bed of potassium fluoride at 70° F. water is extracted from the gasohol. There is recovered through line 18 product containing (i) a gasohol phase including 129 parts of gasoline, 12.1 parts of ethanol, and less than 0.4 parts of water and (ii) a substantially saturated potassium fluoride solution including 5.6 parts of water and 5.6 parts of potassium fluoride.

Product in line 18 is passed to settling operation 19 from which there is withdrawn through line 20 about 141 parts of gasohol containing 129 parts of gasoline, 12.1 parts of ethanol, and less than 0.4 parts of water. The second heavier aqueous phase in settler 19 containing 5.6 parts of water and 5.6 parts of potassium fluoride is removed through line 21 and pump 22. So long as the concentration of potassium fluoride in line 21 is at least 95 w % of the saturation value, the stream in line 21 is passed through line 23 and line 17 to operation 15. The temperature of the stream in line 17 may be adjusted by heat exchanger 24.

If it be found that the concentration of potassium fluoride in line 21 is below 95 w % of the saturation value, at least a portion of that stream is passed through line 25 and heat exchangers 26 and 27 wherein the stream in line 25 is heated to 400° F. before being passed to flashing operation 28. Water is removed overhead in line 29; and saturated solution recovered as flashed bottoms in line 30 is pumped by pump 31 through lines 32 and 17 to operation 15. Potassium fluoride solution may be added or withdrawn through line 33.

Although this invention has been illustrated by reference to specific embodiments, it will be apparent to those skilled in the art that various changes and modifications may be made which clearly fall within the scope of this invention.

I claim:

1. The method of treating a water-containing hydrocarbon charge fuel containing at least one fuel selected from the group consisting of water-containing hydrocarbon fuel boiling in the gasoline boiling range and water-containing gasohol which comprises
   contacting said charge water-containing fuel with a salt selected from the group consisting of potassium fluoride and potassium carbonate thereby forming a multi-phse system including (i) a first phase of supernatant fuel containing less water than is present in said charge fuel and (ii) a second phase containing aqueous solution of said salt; and
   recovering said first phase containing less water than is present in said charge fuel.

2. The method of treating a charge fuel as claimed in claim 1 wherein said charge fuel is gasohol.

3. The method of treating a charge fuel as claimed in claim 1 wherein said charge fuel is gasohol prepared from gasoline and ethanol.

4. The method of treating a charge fuel as claimed in claim 1 wherein said charge fuel is gasohol prepared from gasoline and 95 w % ethanol.

5. The method of treating a charge fuel as claimed in claim 1 wherein said charge fuel is gasohol prepared from gasoline and absolute ethanol.

6. The method of treating a charge fuel as claimed in claim 1 wherein said salt is present as a solid.

7. The method of treating a charge fuel as claimed in claim 1 wherein said salt is present as an aqueous solution.

8. The method of treating a charge fuel as claimed in claim 1 wherein said salt is present as a saturated aqueous solution.

9. The method of treating a charge fuel as claimed in claim 1 wherein said salt is present as a slurry.

10. The method of treating a charge fuel as claimed in claim 1 wherein said salt is present as an aqueous solution together with solid salt.

11. The method of treating a charge fuel as claimed in claim 1 wherein said salt is potassium fluoride.

12. The method of treating a charge fuel as claimed in claim 1 wherein said salt is potassium carbonate.

13. The method of treating a charge water-containing fuel containing at least one fuel selected from the group consisting of water-containing hydrocarbon fuel boiling in the gasoline boiling range and water-containing gasohol which comprises
   contacting said charge water-containing fuel with a substantially saturated aqueous solution of a salt selected from the group consisting of potassium fluoride and potassium carbonate in the presence of said salt in solid phase thereby forming a multi-phase system including (i) a first phase containing substantially dry fuel and (ii) a second phase containing substantially saturated aqueous solution of said salt; and recovering said first phase containing substantially dry fuel.

14. The method of treating a charge as claimed in claim 13 wherein said multi-phase system includes (i) a third phase containing said solid salt.

15. The method of claim 13 wherein said charge is gasohol.

16. The method of claim 13 wherein said charge is gasohol prepared from gasoline and ethanol.

17. The method of claim 13 wherein said charge is gasohol prepared from gasoline and 95 w % ethanol.

18. The method of claim 13 wherein said aqueous solution of salt contains salt in amount of at least about 95 w % of the saturation value at temperature of operation.

19. The method of claim 13 wherein temperature of said treating is ambient temperature.

20. The method of treating a charge water-containing gasohol which comprises contacting said charge water-containing gasohol at 40° F.–120° F. with a substantially saturated aqueous solution of potassium fluoride in the presence of solid potassium fluoride thereby forming a multi-phase system including (i) a first phase containing substantially dry gasohol and (ii) a second phase containing substantially saturated aqueous solution of potassium fluoride; and recovering said first phase containing substantially dry gasohol.

21. The method of treating a water-containing hydrocarbon charge containing at least one fuel selected from the group consisting of water-containing hydrocarbon fuel boiling in the gasoline boiling range and water-containing gasohol which comprises passing a mixture of (i) said water-containing fuel and (ii) a substantially saturated aqueous solution of potassium fluoride through a bed of solid potassium fluoride thereby forming a multi-phase system including (i) a first phase containing substantially dry fuel and (ii) a second phase containing substantially saturated aqueous solution of potassium fluoride;

withdrawing said multi-phase system from said bed of said potassium fluoride;

separating said first phase and said second phase in said withdrawn multi-phase system; and recovering said first phase containing substantially dry fuel.

* * * * *